United States Patent [19]

Major

[11] 4,116,727

[45] Sep. 26, 1978

[54] MAGNETICAL SOFT ALLOYS WITH GOOD MECHANICAL PROPERTIES

[75] Inventor: Rodney Victor Major, Crawley, England

[73] Assignee: Telcon Metals Limited, Sussex, England

[21] Appl. No.: 793,246

[22] Filed: May 3, 1977

Related U.S. Application Data

[63] Continuation-in-part of Ser. No. 661,271, Feb. 25, 1976, abandoned.

[30] Foreign Application Priority Data

Mar. 4, 1975 [GB] United Kingdom ............... 8948/75

[51] Int. Cl.$^2$ .................... H01F 1/14; C22C 38/08; C22C 38/10
[52] U.S. Cl. ................................ 148/31.55; 75/122; 75/123 K; 148/120; 148/121
[58] Field of Search .................... 75/122, 123 K, 170; 148/120, 121, 31.55

[56] References Cited

U.S. PATENT DOCUMENTS

| | | | |
|---|---|---|---|
| 2,111,005 | 3/1938 | Remmers | 148/120 |
| 3,148,092 | 9/1964 | Shull | 148/120 |
| 3,695,944 | 10/1972 | Stroble | 148/31.55 |
| 3,793,092 | 2/1974 | Fiedler | 148/31.55 |
| 4,028,144 | 6/1977 | Tomishima et al. | 148/31.55 |

*Primary Examiner*—Arthur J. Steiner
*Attorney, Agent, or Firm*—Buell, Blenko & Ziesenheim

[57] ABSTRACT

Soft magnetic alloys with good mechanical properties that are relatively insensitive to variations in processing conditions have the composition 2–8% nickel, 0.5–3% vanadium, 33–55% cobalt, balance (apart from conventional alloying ingredients and impurities) iron. Optional alloying ingredients are chromium (0–1%), manganese (0–1%), carbon (0–0.1%), silicon (0–½%), niobium (0–½%) and zirconium (0–0.3%).

11 Claims, 5 Drawing Figures

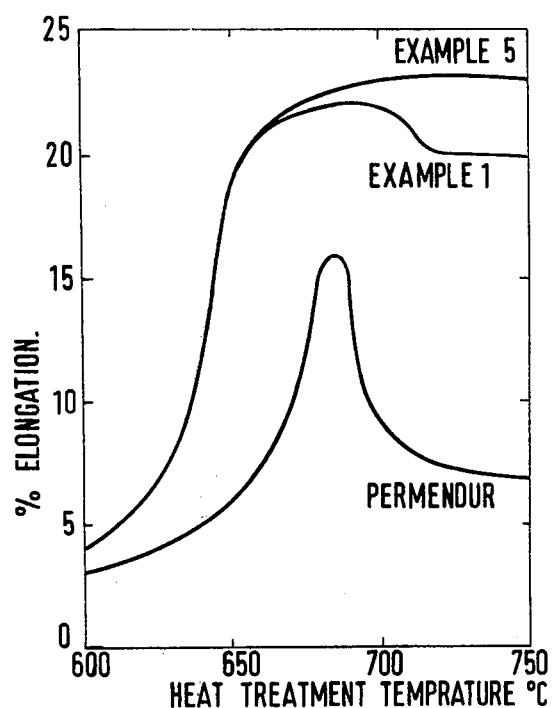
FIG. 2. RELATIONSHIP BETWEEN % ELONGATION AND HEAT TREATMENT TEMPERATURE.
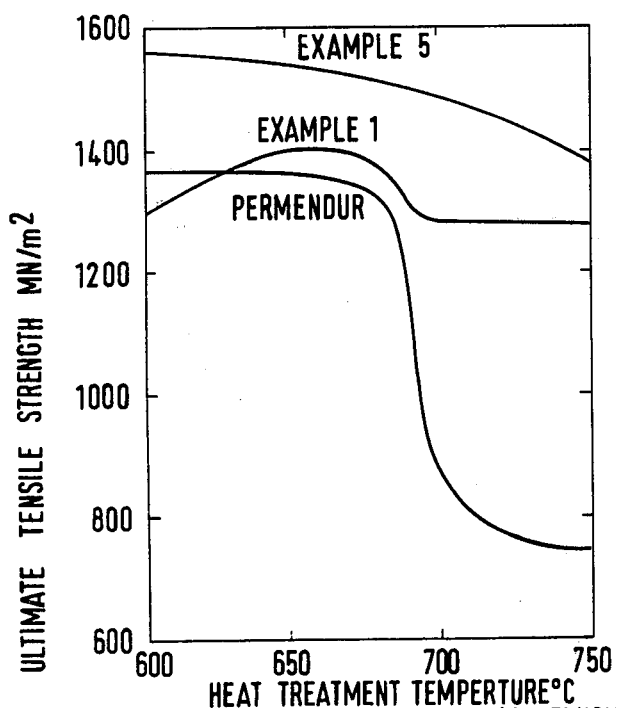
FIG. 3. RELATIONSHIP BETWEEN ULTIMATE TENSILE STRENGTH AND HEAT TREATMENT TEMPERATURE

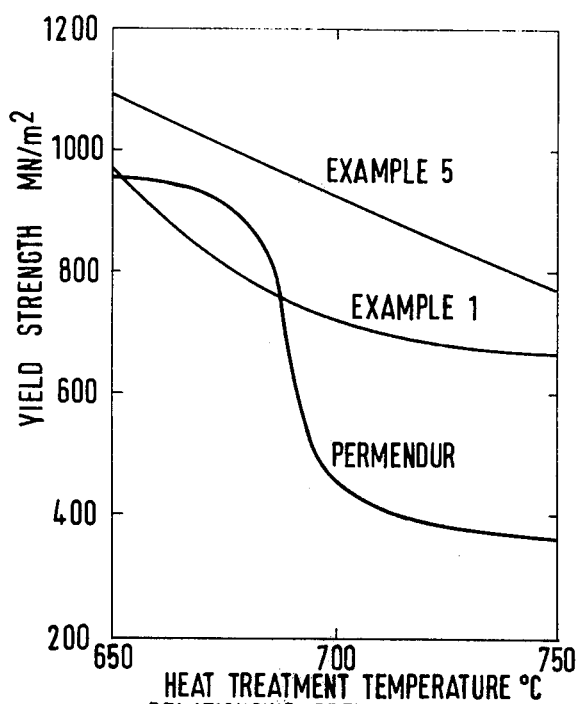
FIG. 4. RELATIONSHIP BETWEEN YIELD STRENGTH AND HEAT TREATMENT TEMPERATURE
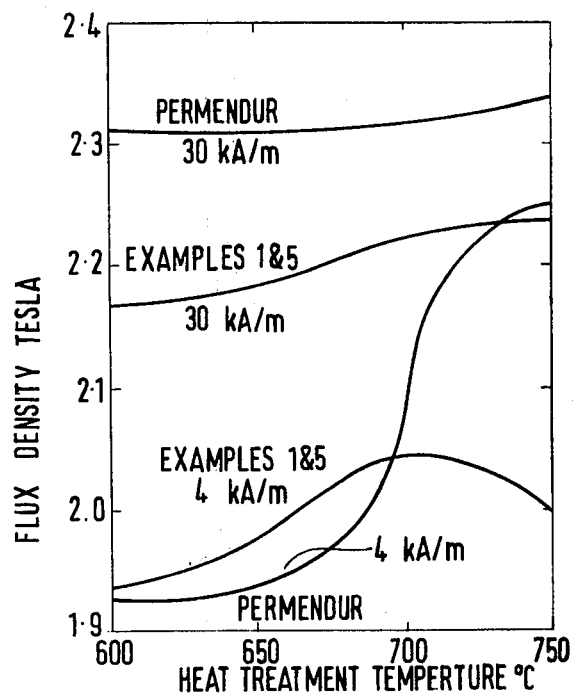
FIG. 5. RELATIONSHIP BEETWEEN MAGNETIC PERFORMANCE AND HEAT TREATMENT TEMPERATURE

MAGNETICAL SOFT ALLOYS WITH GOOD MECHANICAL PROPERTIES

RELATED APPLICATIONS

This is a continuation-in-part of my application Ser. No. 661,271 filed Feb. 25, 1976 and now abandoned.

FIELD OF THE INVENTION

My invention relates to magnetic alloys and more specifically to magnetically-soft alloys with good mechanical properties, such as are required for use in electrical machines rotating at a high speed.

BRIEF DESCRIPTION OF THE DRAWINGS

FIG. 2 is a graph showing the elongation of selected alloys of the invention, and a known alloy for comparison, as a function of heat-treatment temperature;

FIG. 3 is a similar graph for tensile strength;

FIG. 4 is a similar graph for yield strength, and

FIG. 5 is a similar graph for magnetic flux density.

BACKGROUND OF THE INVENTION

Figure 1:
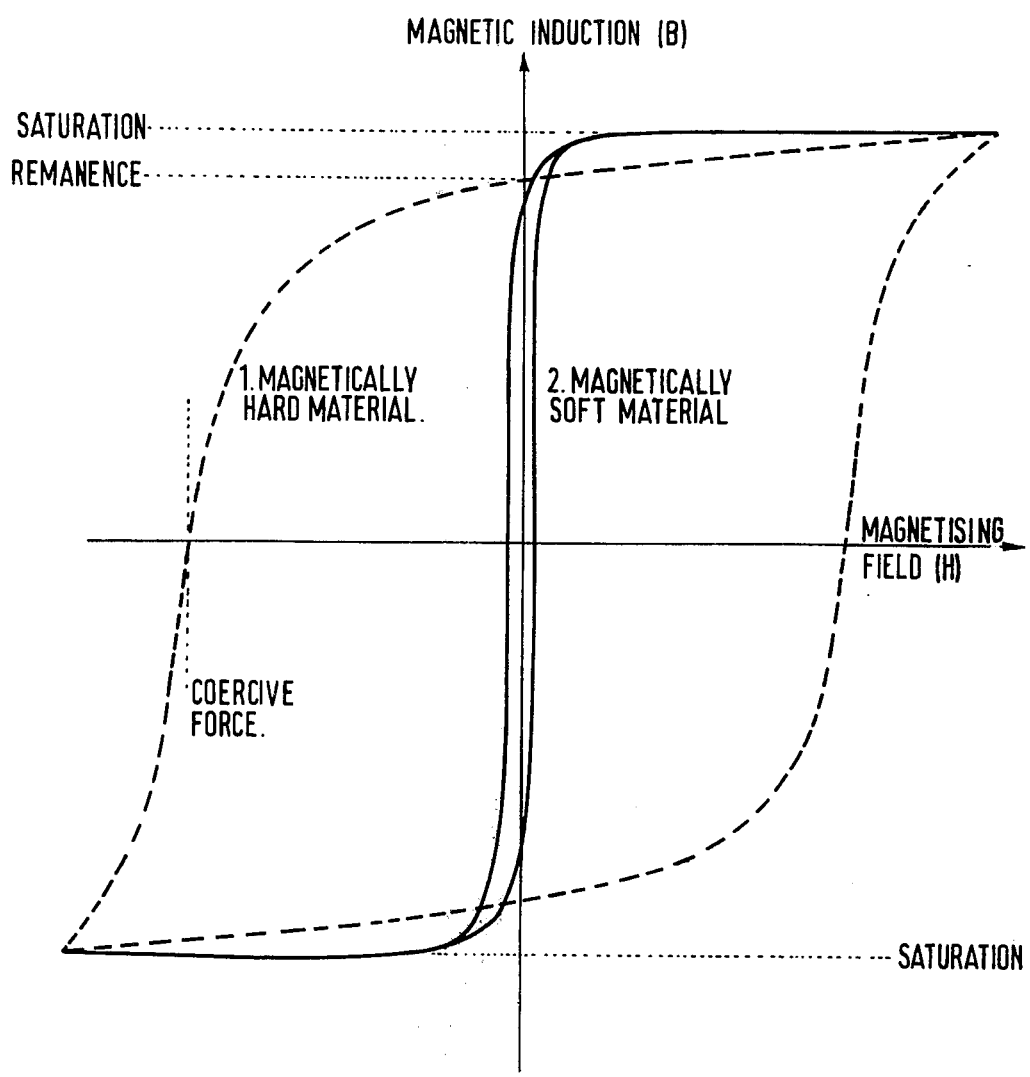
FIG. 1 is a sketch of a magnetic field/magnetic induction graph (hysteresis loop) illustrating the field of the invention.

Ferromagnetic materials are required for two broadly distinct classes of application, first those in which the magnetization of the material is required to resist change under the influence of extraneous magnetic fields, shock vibration, etc. and secondly those in which the magnetization of the material may be changed by small applied fields. Typical of the first class are permanent magnets, e.g. for use in loudspeakers. Typical of the second class are magnetic laminations for motors, generators, transformers and the like.

The ideal material for the first class of application would have characteristics, represented by a wide nearly rectangular curve like curve 1 in FIG. 1, such that once magnetically saturated in one direction a very large reverse field is required to produce any perceptible change in magnetic induction. The ideal material for the second class of application would have properties such that its hysteresis curve reached saturation with a very small applied field (curve 2). Important characteristics of the curve are the saturation induction; the coercive force, that is the reverse field required to reduce the magnetic induction to zero while it continues to be applied; the remanence (or residual induction), that is the induction after removal of a saturating field; and the area enclosed by the curve, which is proportional to the energy loss per cycle of magnetization (assuming an alternating field sufficient to achieve saturation at its peaks).

The designer of a magnetic alloy will almost always have the object of making either (a) an alloy with a high coercive force and high remanence, known either as a "hard magnetic alloy" or as a "magnetically hard alloy", the latter terminology seldom being used unless the context makes it necessary to distinguish expressly between magnetic and mechanical hardness, or (b) an alloy with a minimum coercive force and minimum area enclosed by the hysteresis curve, known correspondingly as a "soft magnetic alloy" or (when similarly necessary) as a "magnetically soft alloy". In some later literature hard magnetic alloys are referred to as "steels" (and contrasted with "soft iron"). Alloys that are intermediate between hard and soft can be made but are used only for a few very specialised applications. For the purposes of this application a magnetic alloy is classed as 'hard' if it has a coercive force in excess of 5kA/m and as 'soft' if it has a coercive force not greater than 1.5 kA/m, and the adjectives 'hard' and 'soft' will not be used herein in their alternative senses.

A known group of soft magnetic alloys comprises 45–50% iron, 45–50% cobalt and about 1.5–2.5% vanadium with a preferred nominal composition of 49% Fe, 49% Co, 2% V. This preferred alloy is sold under the trademark "Permendur" and has been used for some time for a variety of purposes, including in particular the manufacture of stator laminations for electric generators used in aircraft. More recently it has proved possible to process this alloy to a condition suitable for rotor laminations also, but this is dependent on critical control of a heat-treatment cycle that is difficult to achieve, especially in the treatment of commercial quantities of the alloy, because it may be difficult to obtain sufficiently precise control of the temperature of the charge in furnace and because it will take some time for the charge to reach a uniform temperature; moreover the cycle required varies from cast to cast and has to be determined by trial for every cast.

Hard magnetic cobalt-iron alloys including an addition of nickel have been proposed. Representative are Beath et al U.S. Pat. No. 1,743,309 and Martin U.S. Pat. No. 2,596,705. In these alloys the effect of the nickel appears to be to increase the magnetic hardness following heat treatment and in the case of Beath's alloys to stabilise the alloy against deterioration by reduction of its remanence and coercive strength on heating. This prior art indicated that the use of nickel in soft magnetic cobalt-iron alloys would be very deleterious and not worth considering when soft magnetic properties need to be preserved.

SUMMARY OF THE INVENTION

The present invention provides a range of alloys with similar magnetic properties to "Permendur" but which can be processed to obtain comparable or better and consistent mechanical properties over a much wider range of processing condition.

The alloys of the invention comprise 2–8% nickel, 0.5–3% vanadium, 33–55% cobalt, the balance consisting of iron apart from minor alloying ingredients and incidental impurities. Minor alloying ingredients that may be present, with the maximum content of each are as follows: chromium, 1%; manganese, 1%; carbon, 0.1%; silicon, ½%; niobium, ½%; zirconium, 0.3%.

Manganese, silicon and carbon in the ranges indicated assist deoxidation during the melting operation, and chromium can be regarded as a partial replacement for vanadium. Niobium and zirconium, if used, are preferably both present with a preferred minimum content of 0.02% Nb and 0.07% Zr; these amounts increase the mechanical strength of the alloy.

A preferred range of alloys in accordance with the invention comprises 3–5% nickel, 0.5–2.2% vanadium, 47–50% cobalt, 0–0.2% carbon, 0–0.2% silicon, 0–0.2% niobium, and 0–0.2% zirconium, the balance being iron apart from impurities.

The alloys of the invention can be fabricated by rolling and stamping or by forging.

DETAILED DESCRIPTION

Each of the alloys listed in the table below was fabricated into 0.35 mm thick strip by a technique that is conventional for the known alloy (i.e. by casting as an ingot 100 mm square, re-heating to 1220° C. and hot rolling to 2.5 mm thick strip, heat treating at 830° C. for 2 hours, quenching into iced brine and cold rolling). Samples cut from the cold-rolled strip were subjected to heat-treatment in dry pure hydrogen at the temperature indicated for 2 hours (except for the unnumbered comparison example which was heated for 6 hours), followed by slow cooling. The ultimate tensile strength, yield strength and elongation and the magnetic inductions at 4 and at 30 kA/m were measured.

temperature between 655° and 695° C. with an optimum of 685° C. (the precise figures vary from cast to cast, depending on impurity content, etc.); treatment at this optimum will obtain an elongation of about 15%, an ultimate tensile strength of nearly 1200 MN/m$^2$, and a yield strength of nearly 800 MN/m$^2$; at 695° C., these figures would be reduced to about 10%, 900 MN/m$^2$ and 500 MN/m$^2$ respectively; the difficulties that must be surmounted to obtain properties that are sensibly consistent throughout the volume of the specimen and from one specimen to another are thus seen to be formidable. The properties of the alloys of the invention change very much more slowly with temperature; to take one of the more useful examples, the alloy of example 1 has an elongation that is always higher than that of

TABLE

| Example | Composition (weight %) | Treatment Temperature (C) | Ultimate tensile strength (MN/m$^2$) | Yield strength (MN/m$^2$) | Elongation (%) | Magnetic Induction (T) at 4 kA/m | Magnetic Induction (T) at 30 kA/m | Coercive Force (kA/m) |
|---|---|---|---|---|---|---|---|---|
| Known alloy (Pormendur) for comparison | Po 49, Co 49, V 2 (nominal) | 660 | 1,350 | 950 | 8 | 1.97 | 2.30 | 1.7 |
| | | 680 | 1,300 | 880 | 15 | 2.03 | 2.31 | 1.0 |
| | | 700 | 850 | 460 | 8 | 2.13 | 2.32 | 0.4 |
| | | 720 | 770 | 415 | 7 | 2.23 | 2.32 | 0.2 |
| | | 740 | 740 | 385 | 7 | 2.25 | 2.32 | 0.13 |
| 1 | Co 48, V 1.5, Ni 4.5 incidental impurities 0.2, balance iron | 680 | 1,360 | 785 | 22 | 2.035 | 2.22 | 0.56 |
| | | 700 | 1,280 | 740 | 20 | 2.04 | 2.22 | 0.51 |
| | | 720 | 1,280 | 692 | 22 | 2.04 | 2.23 | 0.48 |
| | | 740 | 1,280 | 677 | 20 | 2.01 | 2.24 | 0.48 |
| 2 | Co 45, V 1.6, Ni 2.6, incidental impurities 0.2, balance iron | 680 | 1,200 | 725 | 18 | 1.94 | 2.24 | 0.76 |
| | | 700 | 1,140 | 700 | 18 | 1.94 | 2.25 | — |
| | | 720 | 1,100 | 690 | 14 | 1.97 | 2.25 | — |
| | | 740 | 1,100 | 615 | 12 | 2.01 | 2.25 | — |
| 3 | Co 47, V 1.5, Ni 3.5, incidental impurities 0.2, balance iron | 680 | 1,200 | 850 | 15 | 2.07 | 2.29 | 0.56 |
| | | 700 | 1,280 | 850 | 17 | 2.02 | 2.27 | — |
| | | 720 | 1,220 | 830 | 16 | 2.02 | 2.27 | — |
| | | 740 | 1,170 | 800 | 15 | 2.02 | 2.27 | — |
| 4 | Co 45, V 1.5, Ni 5.3 incidental impurities 0.2, balance iron | 680 | 1,220 | 800 | 17 | 2.08 | 2.30 | 0.71 |
| | | 700 | 1,280 | 800 | 18 | 2.00 | 2.25 | — |
| | | 720 | 1,230 | 720 | 17 | 1.90 | 2.25 | — |
| | | 740 | 1,230 | 690 | 17 | 1.83 | 2.25 | — |
| 5 | Co 47, V 1.4, Ni 5, Nb 0.07 incidental impurities 0.2, balance Iron | 660 | 1,500 | 1,030 | 21 | 2.0 | 2.20 | — |
| | | 680 | 1,500 | 990 | 22 | 2.04 | 2.21 | 0.72 |
| | | 700 | 1,480 | 920 | 23 | 2.06 | 2.23 | — |
| | | 720 | 1,440 | 860 | 23 | 2.05 | 2.24 | — |
| | | 740 | 1,400 | 800 | 23 | 2.04 | 2.25 | — |
| 6 | Co 47, V 1.5, Ni 5, Nb 0.17 incidental impurities 0.2 Balance Iron | 660 | 1,560 | 1,100 | 20 | 1.97 | 2.19 | — |
| | | 680 | 1,540 | 1,030 | 22 | 2.01 | 2.22 | 0.75 |
| | | 700 | 1,520 | 960 | 23 | 2.03 | 2.23 | — |
| | | 720 | 1,480 | 890 | 22 | 2.02 | 2.22 | — |
| | | 740 | 1,430 | 810 | 22 | 2.01 | 2.20 | — |
| 7 | Co 47, V 0.66 Ni 7.4 incidental impurities 0.2 Balance Iron | 660 | 1,220 | 840 | 21 | 2.1 | 2.28 | — |
| | | 680 | 1,220 | 800 | 21 | 2.08 | 2.28 | 0.73 |
| | | 700 | 1,220 | 750 | 21 | 2.08 | 2.26 | — |
| | | 720 | 1,240 | 720 | 20 | 2.04 | 2.26 | — |
| | | 740 | 1,240 | 680 | 20 | 1.96 | 2.26 | — |
| 8 | Co 35, Ni 4.2 V 1.6 incidental impurities 0.2 Balance Iron | 660 | 1,000 | 650 | 10 | 2.04 | 2.34 | — |
| | | 680 | 940 | 630 | 9 | 2.05 | 2.34 | 0.55 |
| | | 700 | 880 | 620 | 7 | 2.05 | 2.34 | — |
| | | 720 | 840 | 600 | 7 | 2.04 | 2.32 | — |
| | | 740 | 800 | 590 | 6 | 2.02 | 2.32 | — |
| 9 for comparison | Co 48, V 3.25 Ni 2.2 incidental impurities 0.2 Balance Iron | 660 | 1540 | 1120 | 12 | 1.60 | 2.04 | — |
| | | 680 | 1510 | 1000 | 15 | 1.58 | 2.03 | 1.6 |
| | | 700 | 1480 | 910 | 18 | 1.54 | 2.02 | — |
| | | 720 | 1430 | 830 | 20 | 1.56 | 2.03 | — |
| | | 740 | 1390 | 750 | 21 | 1.58 | 2.04 | — |
| 10 for comparison | Co 48, Ni 1.75 V 1.7 incidental impurities 0.2 Balance Iron | 660 | 1,400 | 900 | 14 | 1.89 | 2.18 | — |
| | | 680 | 900 | 540 | 9 | 2.10 | 2.28 | 0.7 |
| | | 700 | 730 | 440 | 7 | 2.10 | 2.28 | — |
| | | 720 | 730 | 420 | 8 | 2.12 | 2.28 | — |
| | | 740 | 730 | 400 | 8 | 2.12 | 2.28 | — |

FIGS. 2-5 illustrate various properties of the cold-rolled strip made from two typical alloys of the invention, and of one particular cast of "Permendur" for comparison, as a function of heat-treatment temperature; the effect of heat-treatment time is insignificant within the practical range for the alloys of my invention, in fact heating for 4 hours instead of 2 hardly makes a detectable difference.

These figures are largely self-explanatory, but it should be noted that to secure "Permendur" with an elongation of 10% or better requires a heat-treatment "Permendur", and varies only in the range from 19 to 22% for heat-treatment temperatures from 650° to 750° C.; a tensile strength that is always comparable with the best that can be achieved with Permendur and varying only between about 1280 and 1400 MN/m$^2$ for heat-treatment temperatures over the whole range 600°–750° C.; and a yield strength that is comparable with correctly processed Permendur and varies only between about 675 and 915 MN/m$^2$ for heat-treatment temperatures in the whole range 650°–750° C. In fact the elongation of the alloy of Example 1 would be equal to or better than that of Permendur heat-treated at the optimum of 685° C., and if heat-treated as high as 750° C. would still have a better elongation than Permendur heat-treated at only 690° C. The tensile strength and yield strength may also be better, or at any rate will be comparable. This improvement is accompanied by a deterioration of less than 10% in the flux density up to 30,000 A/m, and at lower excitations even the flux density is less sensitive to variations in heat-treatment temperature (FIG. 4).

Comparison example 9 illustrates the poor magnetic properties that result if a vanadium content higher than about 3 is used, and comparison example 10 illustrates the relatively poor and inconsistent mechanical properties of alloys with less than about 2% nickel.

The invention includes a method of improving the tolerance to heat-treatment of alloys of the group comprising 45–50% iron, 43–50% cobalt and 1.5–2.5% vanadium, which method comprises the addition to the alloy of 2–8% nickel.

Metallurgical examination of the alloys of the invention shows a fine microstructure for all heat-treatment temperatures (the degradation of Permendur at higher treatment temperatures seems to be associated with grain growth). X-ray examination of the alloy of Example 1 shows the presence of a gamma phase and it is thought, but has not yet been confirmed, that this may prove to be true of all the alloys of the invention.

The required coercive force of not more than 1.5 kA/m and other desirable properties described are obtained when the alloys of my invention are heat-treated at temperatures in the range 680°–750° C.; in many cases this temperature range can be extended to 650°–750° C.

What I claim as my invention is:

1. A soft magnetic alloy which after heat-treatment at a temperature in the range of 680°–750° C. has a coercive force not greater than 1.5 kA/m, a fine microstructure having ductility and strength characteristics that are relatively insensitive to the heat-treatment temperature within said range, the alloy consisting essentially of 2–8% nickel, 0.5–3% vanadium, 33–35% cobalt, 0–1% chromium, 0–1% manganese, 0–0.1% carbon, 0–0.5% silicon, 0–0.5% niobium, 0–0.3% zirconium and the balance iron apart from alloying ingredients and incidental impurities.

2. An alloy in accordance with claim 1 comprising at least 0.02% niobium and also at least 0.07% zirconium.

3. A soft magnetic alloy which after heat-treatment at a temperature in the range of 680°–750° C. has a coercive force not greater than 1.5 kA/m, a fine microstructure having ductility and strength characteristics that are relatively insensitive to the heat-treatment temperature within said range, the alloy consisting essentially of 3–5% nickel, 0.5–2.2% vanadium, 47–50% cobalt, 0–0.7% chromium, 0–0.2% manganese, 0–0.02% carbon, 0–0.2% silicon, 0–0.2% niobium, 0–0.2% zirconium and the balance iron apart from impurities.

4. A soft magnetic alloy which after fabrication into strip by cold rolling followed by heat-treatment at any temperature in the range 680°–750° C. has a coercive force not greater than 1.5 kA/m, a fine microstructure exhibiting a gamma phase, an elongation in the range from about 20 to about 22%, an ultimate tensile strength in the range from about 1300 to about 1400 MN/m$^2$ and a yield strength in the range from about 675 to about 785 MN/m$^2$, the alloy consisting essentially of substantially 4.5% nickel, 48% cobalt, 1.5% vanadium, and 46% iron and impurities.

5. A soft magnetic alloy which after fabrication into strip by cold rolling followed by heat-treatment at any temperature in the range 680°–740° C. has a coercive force not greater than 1.5 kA/m, a fine microstructure, an elongation in the range from about 12 to about 18%, an ultimate tensile strength in the range from about 1100 to about 1200 MN/m$^2$ and a yield strength in the range from about 615 to about 725 MN/m$^2$, the alloy consisting essentially of substantially 2.6% nickel, 45% cobalt, 1.6% vanadium, and 50.8% iron and impurities.

6. A soft magnetic alloy which after fabrication into strip by cold rolling followed by heat-treatment at any temperature in the range 680°–740° C. has a coercive force not greater than 1.5 kA/m, a fine microstructure, an elongation in the range from about 1170 to about 1280 MN/m$^2$ and a yield strength in the range from about 800 to about 850 MN/m$^2$, the alloy consisting essentially of substantially 3.5% nickel, 47% cobalt, 1.5% vanadium, and 48% iron and impurities.

7. A soft magnetic alloy which after fabrication into strip by cold rolling followed by heat-treatment at any temperature in the range 680°–740° C. has a coercive force not greater than 1.5 kA/m, a fine microstructure, an elongation in the range from about 17 to about 18%, an ultimate tensile strength in the range from about 1220 to about 1280 MN/m$^2$ and a yield strength in the range from about 690 to about 800 MN/m$^2$, the alloy consisting essentially of substantially 5.3% nickel, 45% cobalt, 1.5% vanadium, and 47.8% iron and impurities.

8. A soft magnetic alloy which after fabrication into strip by cold rolling followed by heat-treatment at any temperature in the range 680°–740° C. has a coercive force not greater than 1.5 kA/m, a fine microstructure, an elongation in the range from about 21 to about 23%, an ultimate tensile strength in the range from about 1400 to about 1500 MN/m$^2$ and a yield strength in the range from about 800 to about 990 MN/m$^2$, the alloy consisting essentially of substantially 5% nickel, 47% cobalt, 1.4% vanadium, 0.07% niobium and 46.5% iron and impurities.

9. A soft magnetic alloy which after fabrication into strip by cold rolling followed by heat-treatment at any temperature in the range 680°–740° C. has a coercive force not greater than 1.5 kA/m, a fine microstructure, an elongation in the range from about 20 to about 23%, an ultimate tensile strength in the range from about 1430 to about 1540 MN/m$^2$ and a yield strength in the range from about 810 to about 1030 MN/m$^2$, the alloy consisting essentially of substantially 5% nickel, 47% cobalt, 1.5% vanadium, 0.017% niobium and 46.5% iron and impurities.

10. A soft magnetic alloy which after fabrication into strip by cold rolling followed by heat-treatment at any temperature in the range 680°–740° C. has a coercive force not greater than 1.5 kA/m, a fine microstructure, an elongation in the range from about 20 to about 21%, an ultimate tensile strength in the range from about 1200 to about 1240 MN/m$^2$ and a yield strength in the range from about 680 to about 800 MN/m$^2$, the alloy consisting essentially of substantially 7.4% nickel, 47% cobalt, 0.66% vanadium, and 45% iron and impurities.

11. A soft magnetic alloy which after fabrication into strip by cold rolling followed by heat-treatment at any temperature in the range 680°–740° C. has a coercive force not greater than 1.5 kA/m, a fine microstructure, an elongation in the range from about 6 to about 9%, an ultimate tensile strength in the range from about 800 to about 940 MN/m$^2$ and a yield strength in the range from about 590 to about 630 MN/m$^2$, the alloy consisting essentially of substantially 4.2% nickel, 35% cobalt, 1.6% vanadium, and 59% iron and impurities.

* * * * *

UNITED STATES PATENT AND TRADEMARK OFFICE
CERTIFICATE OF CORRECTION

PATENT NO. : 4,116,727
DATED : September 26, 1978
INVENTOR(S) : Rodney Victor Major It is certified that error appears in the above-identified patent and that said Letters Patent are hereby corrected as shown below:

In the TABLE, under Example column, "(Pormondur)" should read --(Permendur)--.

In the TABLE, under Composition (weight %) column, "Po" should read --Fe--.

Signed and Sealed this

Nineteenth Day of December 1978

[SEAL]

Attest:

RUTH C. MASON
Attesting Officer

DONALD W. BANNER
Commissioner of Patents and Trademarks